(12) United States Patent
Marco

(10) Patent No.: US 10,921,140 B2
(45) Date of Patent: Feb. 16, 2021

(54) NAVIGATING DRIVERS TO SERVICE TRANSPORTATION REQUESTS FROM A SIMPLIFIED TRANSPORTATION REQUEST DEVICE

(71) Applicant: Lyft, Inc., San Francisco, CA (US)

(72) Inventor: Talmon Marco, Tel Aviv (IL)

(73) Assignee: LYFT, INC., San Francisco, CA (US)

( * ) Notice: Subject to any disclaimer, the term of this patent is extended or adjusted under 35 U.S.C. 154(b) by 159 days.

(21) Appl. No.: 16/122,159

(22) Filed: Sep. 5, 2018

(65) Prior Publication Data

US 2019/0003844 A1  Jan. 3, 2019

Related U.S. Application Data

(63) Continuation of application No. 15/278,153, filed on Sep. 28, 2016, now Pat. No. 10,101,166.

(51) Int. Cl.
*G01C 21/34* (2006.01)
*G06Q 10/08* (2012.01)
(Continued)

(52) U.S. Cl.
CPC ......... *G01C 21/3438* (2013.01); *G01C 21/34* (2013.01); *G06Q 10/00* (2013.01);
(Continued)

(58) Field of Classification Search
CPC ... G01C 21/3438; G01C 21/34; H04W 4/021; G08G 1/202; G06Q 50/30;
(Continued)

(56) References Cited

U.S. PATENT DOCUMENTS 6,014,430 A * 1/2000 Gosney ................. H04M 3/533
  379/93.12
8,005,488 B2 * 8/2011 Staffaroni ........ G06Q 10/06311
  455/456.2

(Continued)

OTHER PUBLICATIONS

Amazon.com; "Get to Know Your Dash Button", retrieved from hllps://web.archive.org/web/20150905190202/http://www.amazon.com;gp/help/customer/display.html?nodeld=201746300; retrieved Mar. 30, 2017; 2 pages.

(Continued)

*Primary Examiner* — Michael V Kerrigan
(74) *Attorney, Agent, or Firm* — Keller Jolley Preece

(57) ABSTRACT

Systems and methods for navigating drivers to service transportation requests from a simplified transportation request device are described. In one implementation, a method includes establishing, by a processing device of a server device, a communication connection with a transportation request device dedicated solely to functions associated with a transportation service, communicating, via the communication connection, configuration information with the transportation request device, receiving, via the communication connection, one or more passenger preferences associated with the transportation service and a user of the transportation request device, receiving one or more transportation requests from the transportation request device, and causing, by the processing device, the received one or more transportation requests to be serviced based on the configuration information and the one or more passenger preferences.

20 Claims, 6 Drawing Sheets

(51) Int. Cl.
    *G06Q 10/00*     (2012.01)
    *G06Q 50/10*     (2012.01)
    *G06Q 30/02*     (2012.01)
    *G06Q 50/30*     (2012.01)
    *G08G 1/00*     (2006.01)
    *H04W 4/021*     (2018.01)

(52) U.S. Cl.
    CPC ... *G06Q 10/08355* (2013.01); *G06Q 30/0283* (2013.01); *G06Q 50/10* (2013.01); *G06Q 50/30* (2013.01); *G08G 1/202* (2013.01); *H04W 4/021* (2013.01)

(58) Field of Classification Search
    CPC .... G06Q 30/0283; G06Q 50/10; G06Q 10/00; G06Q 10/08355
    See application file for complete search history.

(56) References Cited

U.S. PATENT DOCUMENTS

| | | |
|---|---|---|
| 10,101,166 B2 | 10/2018 | Marco |
| 2004/0035315 A1 | 2/2004 | Richards |
| 2006/0276960 A1 | 12/2006 | Adamczyk et al. |
| 2011/0099040 A1* | 4/2011 | Felt ................ G08G 1/202 705/7.12 |
| 2012/0041675 A1 | 2/2012 | Juliver et al. |
| 2016/0110836 A1 | 4/2016 | Garg et al. |

OTHER PUBLICATIONS

Amazon.com; "Place an Order with Your Dash Button", retrieved from https://web.archive.org/web/20150905195545/http://www.amazon.com/gp/help.customer/display/html?nodeId=201746380 on Mar. 30, 2017; 2 pages.

Amazon.com; "Set Up Your Dash Button", retrieved from hllps://web.archive.org/web/2015090607241/http://www.amazon.com/gp/help.customer/display/html?nodeId=201746340 on Mar. 30, 2017; 4 pages.

The extended European Search Report for EP Application No. EP17193548.9-1958, dated Jan. 3, 2018, 7 pages.

USPTO, Office Action for U.S. Appl. No. 15/278,153, dated Jan. 26, 2018.

USPTO, Notice of Allowance for U.S. Appl. No. 15/278,153, dated Jun. 13, 2018.

Office Action as received in Russian Application 2017133626 dated Mar. 30, 2020.

Search Report as received in Russian Application 2017133626 dated Mar. 24, 2020.

Office Action as received in European Application 17193548.9 dated Nov. 5, 2019.

Communication pursuant to Art. 94(3) EPC as received in European Application 17193548.9 dated Dec. 4, 2020.

\* cited by examiner

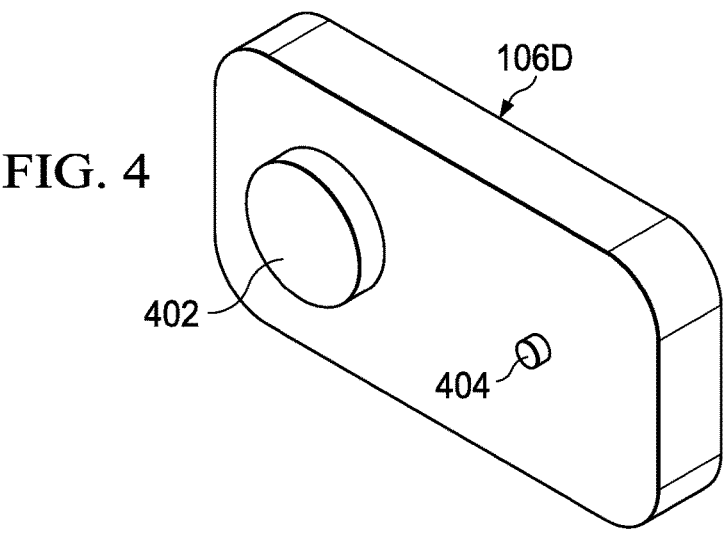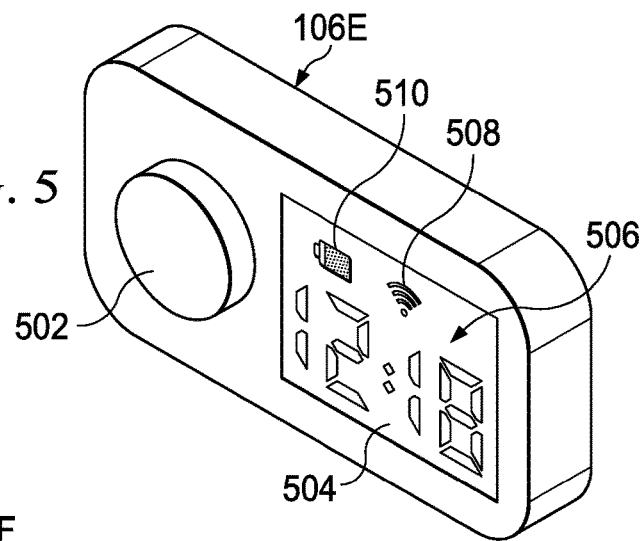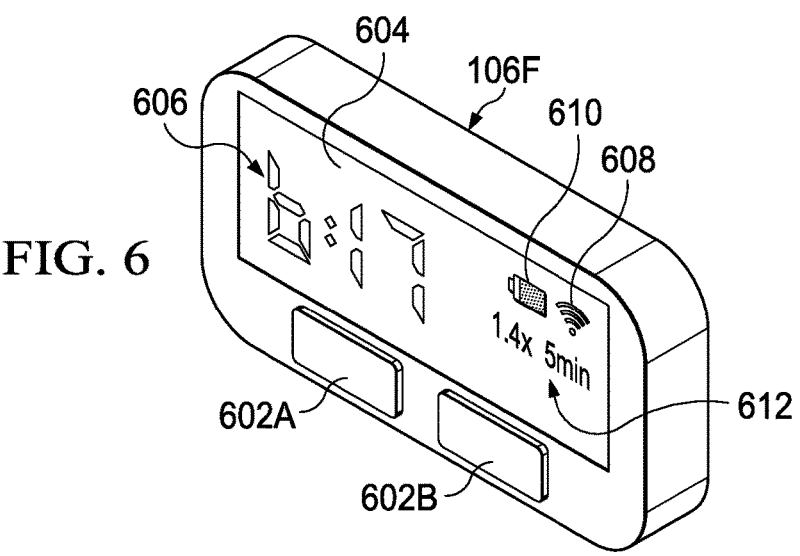

NAVIGATING DRIVERS TO SERVICE TRANSPORTATION REQUESTS FROM A SIMPLIFIED TRANSPORTATION REQUEST DEVICE

RELATED APPLICATIONS

This application is a continuation application of U.S. patent application Ser. No. 15/278,153, filed on Sep. 28, 2016, the entire content of which is hereby incorporated by reference.

TECHNICAL FIELD

This disclosure relates in general to the field of mobile applications and, more particularly, to a system for navigating drivers to service transportation requests from a simplified transportation request device.

BACKGROUND

A transportation service may utilize a plurality of drivers that fulfill passenger requests for transportation. A transportation service may provide one or more mobile applications that facilitate the efficient pairing of passengers and drivers. The transportation service may receive a transportation request and select a driver to fulfill the request based on information associated with the transportation request and information associated with the driver.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 4 illustrates a simplified transportation request device in accordance with certain embodiments.

FIG. 5 illustrates a simplified transportation request device in accordance with certain embodiments.

FIG. 6 illustrates a simplified transportation request device in accordance with certain embodiments.

DETAILED DESCRIPTION OF EXAMPLE EMBODIMENTS

Overview

In one embodiment a first transportation request is received at a backend server from a first device dedicated solely to functions associated with a transportation service, wherein the first device sends the first transportation request in response to a user pressing a button of the first device, wherein direct user input to the first device is limited to one or two buttons. In response to receiving the first transportation request, an account of the user is accessed to identify a geographical location associated with the first device. A driver associated with the transportation service is navigated to pick up the user at the geographical location associated with the first device.

EXAMPLE EMBODIMENTS

Figure 1:
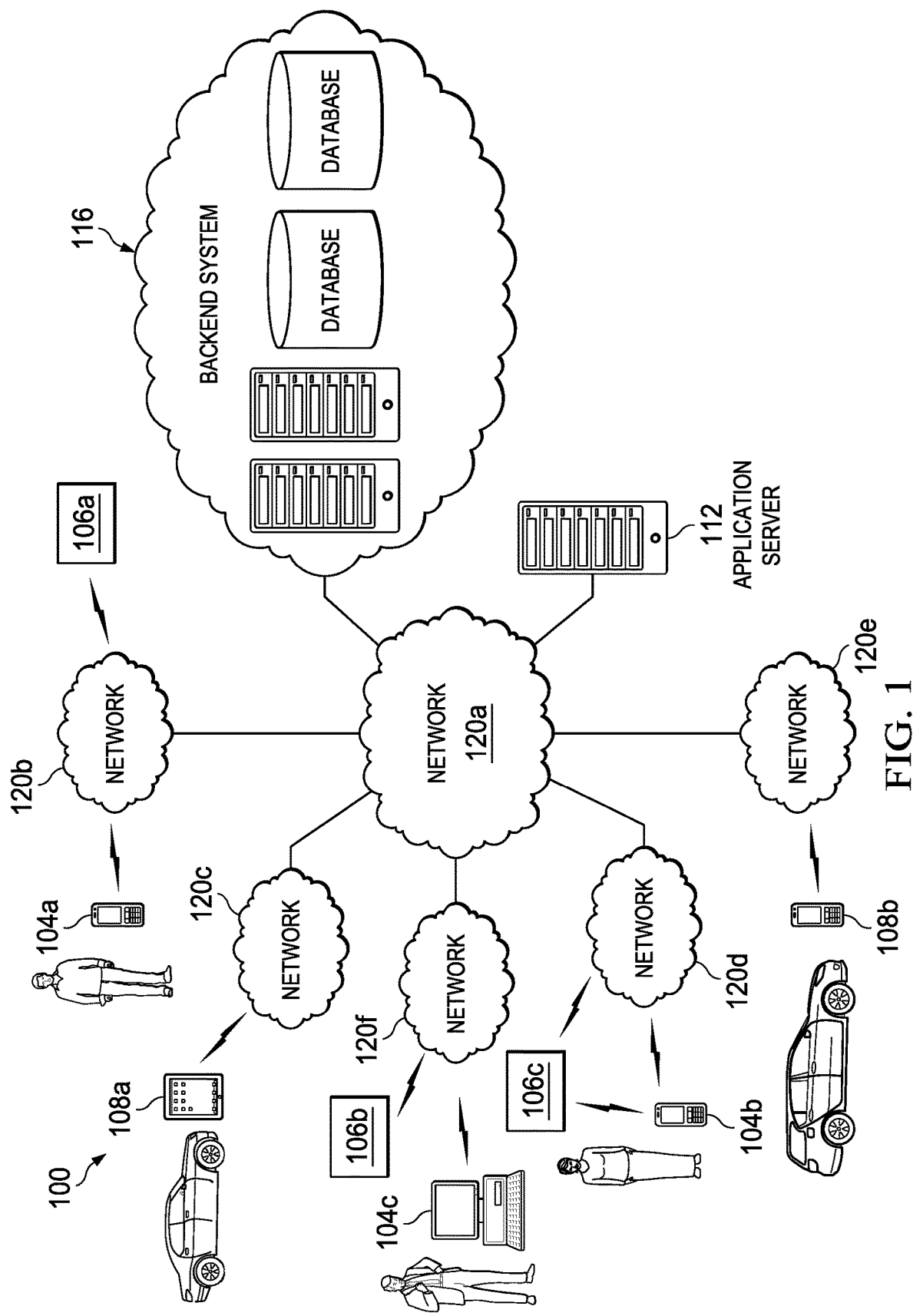
FIG. 1 illustrates a block diagram of a system for navigating drivers to service transportation requests from a simplified transportation request device in accordance with certain embodiments.

FIG. 1 illustrates a block diagram of a system 100 for navigating drivers to service transportation requests from a simplified transportation request device in accordance with certain embodiments. Although various embodiments may include any number of drivers, passengers, and associated devices, system 100 depicts three passengers having associated passenger computing devices 104, two drivers having associated driver computing devices 108, and three simplified transportation devices 106. The computing devices are coupled through various networks 120 to an application server 112 and a backend system 116.

Various embodiments of the present disclosure may enhance the experience of passengers and drivers associated with a transportation service by allowing a passenger to quickly request a ride using a simplified transportation request device (hereinafter referred to as "simplified device"). In various embodiments, the simplified device may provide a button that, when pushed, initiates a communication to a transportation service to request that a driver be sent to the location of the passenger. In particular embodiments, a location associated with the simplified device may be specified by a passenger and communicated to backend system 116 during configuration of the simplified device, such that when a ride is requested using the simplified device, a driver will be sent to the location that was specified during configuration. In particular embodiments, the simplified device may include a display that shows an estimate of the amount of time remaining before the driver arrives. In various embodiments, the simplified device may include a plurality of buttons that are each operable to initiate the request of a particular type of vehicle. In various embodiments, the simplified device may allow a passenger to request a vehicle without logging into the passenger's account or opening up an application before making the request.

Various embodiments may provide technical advantages such as reducing communication bandwidth and latency involved in requesting rides from a transportation service, reducing the power consumed by a transportation request device, and increasing the speed of a communication request, among other technical advantages.

Computing devices 104, 106, and 108 may include any electronic computing device operable to receive, transmit, process, and store any appropriate data. In various embodiments, computing devices 104, 106, and 108 may be mobile devices or stationary devices. As examples, mobile devices may include laptop computers, tablet computers, smartphones, personal digital assistants, smartwatches, computers integrated with a vehicle, computers integrated with clothing, and other devices capable of connecting (e.g., wirelessly) to one or more networks 120 while stationary devices may include desktop computers, televisions, or other devices that are not easily portable. Devices 104, 106, and 108 may include a set of programs such as operating systems (e.g., Microsoft Windows, Linux, Android, Mac OSX, Apple iOS, UNIX, or other operating system), applications, plug-ins, applets, virtual machines, machine images, drivers, executable files, and other software-based programs capable of being run, executed, or otherwise used by the respective devices. Each computing device can include at least one graphical display and user interface allowing a user to view and interact with applications and other programs of the computing device. In a particular embodiment, computing device 108 may be a hardened device that is configured to only run a driver application using a specialized operating system (e.g., a modified version of Android). In one embodiment, a transportation service may issue or otherwise facilitate the provision of hardened devices to its drivers, but restrict the functionality of the devices to the driver application (i.e., the devices may be locked down so as not to allow the installation of additional applications or may only allow preapproved applications to be installed).

In various embodiments, a driver computing device 108 may be integrated within and/or communicate with a self-driven vehicle (e.g., a vehicle that has the capability of driving without physical steering guidance from a human being) and may influence the movement of the vehicle by providing route information (e.g., passenger pick-up and destination locations driver destination locations, navigational directions, etc.) to the self-driven vehicle. Accordingly, as used herein "driver" may refer to a human being that may physically drive or otherwise control movement of a vehicle or to the vehicle itself (e.g., in the case of a self-driven vehicle) or component thereof (e.g., computing device application 108 or logic thereof).

In particular embodiments, a passenger application runs on passenger computing devices 104. The application may allow a user to enter various account information (e.g., in connection with a registration with the transportation service) to be utilized by a transportation service. For example, the account information may include a user name and password (or other login credentials), contact information of the user (e.g., phone number, home address), payment information (e.g., credit card numbers or bank account numbers and associated information), or car preference information (e.g., what models or color of car the user prefers).

The application may allow a user to request a ride from the transportation service. In particular embodiments, the application may log in to the passenger's account (i.e., may establish a connection with backend system using one or more login credentials associated with the passenger) when the application is opened or before a ride request is sent to the backend system. In various embodiments, the application may establish a pick-up location automatically or based on user input (e.g., locations may include the current location of the computing device 104 as determined by a global positioning system (GPS) of the computing device or a different user-specified location). In certain embodiments, the user may specify a destination location as well. The locations may be specified in any suitable format, such as GPS coordinates, street address, establishment name (e.g., LaGuardia Airport, Central Park, etc.), or other suitable format. At any time (e.g., before the ride, during the ride, or after the ride is complete) the user may specify a method of payment to be used for the ride. The user may also specify whether the request is for immediate pick-up or for a specified time in the future. In various embodiments, the user may specify pick-up by a vehicle that has particular merchandise available for use by the user, such as a specified type of battery charger, bottle of water or other food or beverage, umbrella, or other suitable merchandise. The user may also specify criteria for the driver, such as a minimum performance rating, such that drivers having performance ratings below the minimum performance rating will not be considered during selection of the driver.

The user may use the application to order a ride based on the specified information. The request for the ride is generated based on the information and transmitted to backend system 116. Backend system 116 will facilitate the selection of a driver. In some embodiments, backend system 116 may select a driver based on any suitable factors, such as the information contained in the request from the passenger, the proximity of the driver to the passenger, or other suitable factors. In other embodiments, backend system 116 may select a plurality of drivers that could fulfill the ride request, send information associated with the drivers to the passenger, and allow the passenger to select the driver to be used via the application on the passenger computing device 104. Any suitable information about the potential driver(s) may be sent to the computing device 104 either before or after the selection of the driver by the passenger, such as a location of a driver, an estimated pick-up time, a type of car used by a driver, the merchandise available in the car, driver ratings or comments from other passengers about the driver, or other suitable information.

Once a driver has been selected and has accepted the request to provide a ride, the application may notify the user of the selected driver and provide real-time updates of the driver's location (e.g., with respect to the passenger's location) and estimated pick-up time. The application may also provide contact information for the driver and/or the ability to contact the driver through the application (e.g., via a phone call or text). Once the ride has begun, the application may display any suitable information, such as the current location of the computing device 104 and the route to be taken. Upon completion of the ride, the application may provide the passenger the ability to rate the driver or provide comments about the driver.

In particular embodiments, a driver application runs on driver computing devices 108. The application may allow a driver to enter various account information to be utilized by a transportation service. For example, the account information may include a user name and password (or other login credentials), contact information of the driver (e.g., phone number, home address), information used to collect payment (e.g., bank account information), vehicle information (e.g., what model or color of car the driver utilizes), merchandise offered by the driver, or other suitable information.

In various embodiments, the application may allow a driver to specify his availability to transport passengers for the transportation service. In some embodiments, the driver may select between multiple levels of availability. In one example, the driver may be "available," meaning that the driver is willing to receive and consider any transportation requests that the transportation service sends the driver; the driver may be "unavailable," meaning that the driver is not willing to receive any transportation requests (e.g., this state may be explicitly indicated by the driver inputting this state into his computing device or may be detected through a deduction that the driver's device is not logged in to the transportation service through the driver application), or the driver may be "inactive," meaning that the driver only desires to receive particular requests meeting certain exception criteria.

The application may periodically transmit the current location of the computing device 108 as determined by a GPS of the computing device 108 to the backend system 116. When a driver is selected to provide (or is identified as a suitable candidate for) a ride, backend system 116 may send a notification to the driver application. In some embodiments, the driver may have a limited amount of time to select whether the driver accepts the ride. In other embodiments, the application may be configured by the driver to automatically accept the ride or to automatically accept the ride if certain criteria are met (e.g., fare minimum, direction of travel, minimum passenger rating, etc.).

Once a pairing of the driver and the passenger is confirmed by backend system 116, the application may navigate the driver to the passenger. The application may also provide contact information for the passenger and/or the ability to contact the passenger through the application (e.g., via a phone call, email, instant message, or text). The application may also navigate the driver to the passenger's destination once the ride begins. Upon completion of the ride, the application may provide the driver the ability to rate the passenger or provide comments about the passenger.

System 100 may include one or more application servers 112 coupled to the computing devices through one or more networks 120. The passenger application and driver application may be supported with, downloaded from, served by, or otherwise provided through an application server 112 or other suitable means. In some instances, the applications can be downloaded from an application storefront onto a particular computing device using storefronts such as Google Android Market, Apple App Store, Palm Software Store and App Catalog, RIM App World, etc., or other sources. In various embodiments, the passenger application and driver application may be installed on their respective devices in any suitable manner and at any suitable time. As one example, a passenger application may be installed on a computing device as part of a suite of applications that are pre-installed prior to provision of the computing device to a consumer. As another example, a driver application may be installed on a computing device by a transportation service (or an entity that provisions computing devices for the transportation service) prior to the issuance of the device to a driver that is employed or otherwise associated with the transportation service.

As described above, applications utilized by computing devices 104 and 108 can make use of a backend system 116. Backend system 116 may comprise any suitable servers or other computing devices that facilitate the provision of a transportation service as described herein. For example, backend system 116 may receive a request from a passenger and facilitate the assignment of a driver to fulfill the request. Backend system 116 is described in more detail in connection with FIG. 3.

In general, servers and other computing devices of backend system 116 or application server 112 may include electronic computing devices operable to receive, transmit, process, store, or manage data and information associated with system 100. As used in this document, the term "computing device," is intended to encompass any suitable processing device. For example, portions of backend system 116 or application server 112 may be implemented using servers (including server pools) or other computers. Further, any, all, or some of the computing devices may be adapted to execute any operating system, including Linux, UNIX, Windows Server, etc., as well as virtual machines adapted to virtualize execution of a particular operating system, including customized and proprietary operating systems.

Further, servers and other computing devices of system 100 can each include one or more processors, computer-readable memory, and one or more interfaces, among other features and hardware. Servers can include any suitable software component or module, or computing device(s) capable of hosting and/or serving a software application or services (e.g., services of application server 112 or backend system 116), including distributed, enterprise, or cloud-based software applications, data, and services. For instance, servers can be configured to host, serve, or otherwise manage data sets, or applications interfacing, coordinating with, or dependent on or used by other services, including transportation service applications and software tools. In some instances, a server, system, subsystem, or computing device can be implemented as some combination of devices that can be hosted on a common computing system, server, server pool, or cloud computing environment and share computing resources, including shared memory, processors, and interfaces.

In various embodiments, backend system 116 or any components thereof may be deployed using a cloud service such as Amazon Web Services, Microsoft Azure, or Google Cloud Platform. For example, the functionality of the backend system 116 may be provided by virtual machine servers that are deployed for the purpose of providing such functionality or may be provided by a service that runs on an existing platform.

System 100 also includes various networks 120 used to communicate data between the computing devices 104 and 108, the backend system 116, and the application server 112. The networks 120 described herein may be any suitable network or combination of one or more networks operating using one or more suitable networking protocols. A network may represent a series of points, nodes, or network elements and interconnected communication paths for receiving and transmitting packets of information. For example, a network may include one or more routers, switches, firewalls, security appliances, antivirus servers, or other useful network elements. A network may provide a communicative interface between sources and/or hosts, and may comprise any public or private network, such as a local area network (LAN), wireless local area network (WLAN), metropolitan area network (MAN), Intranet, Extranet, Internet, wide area network (WAN), virtual private network (VPN), cellular network (implementing GSM, CDMA, 3G, 4G, LTE, etc.), or any other appropriate architecture or system that facilitates communications in a network environment depending on the network topology. A network can comprise any number of hardware or software elements coupled to (and in communication with) each other through a communications medium. In some embodiments, a network may simply comprise a transmission medium such as a cable (e.g., an Ethernet cable), air, or other transmission medium.

Figure 2:
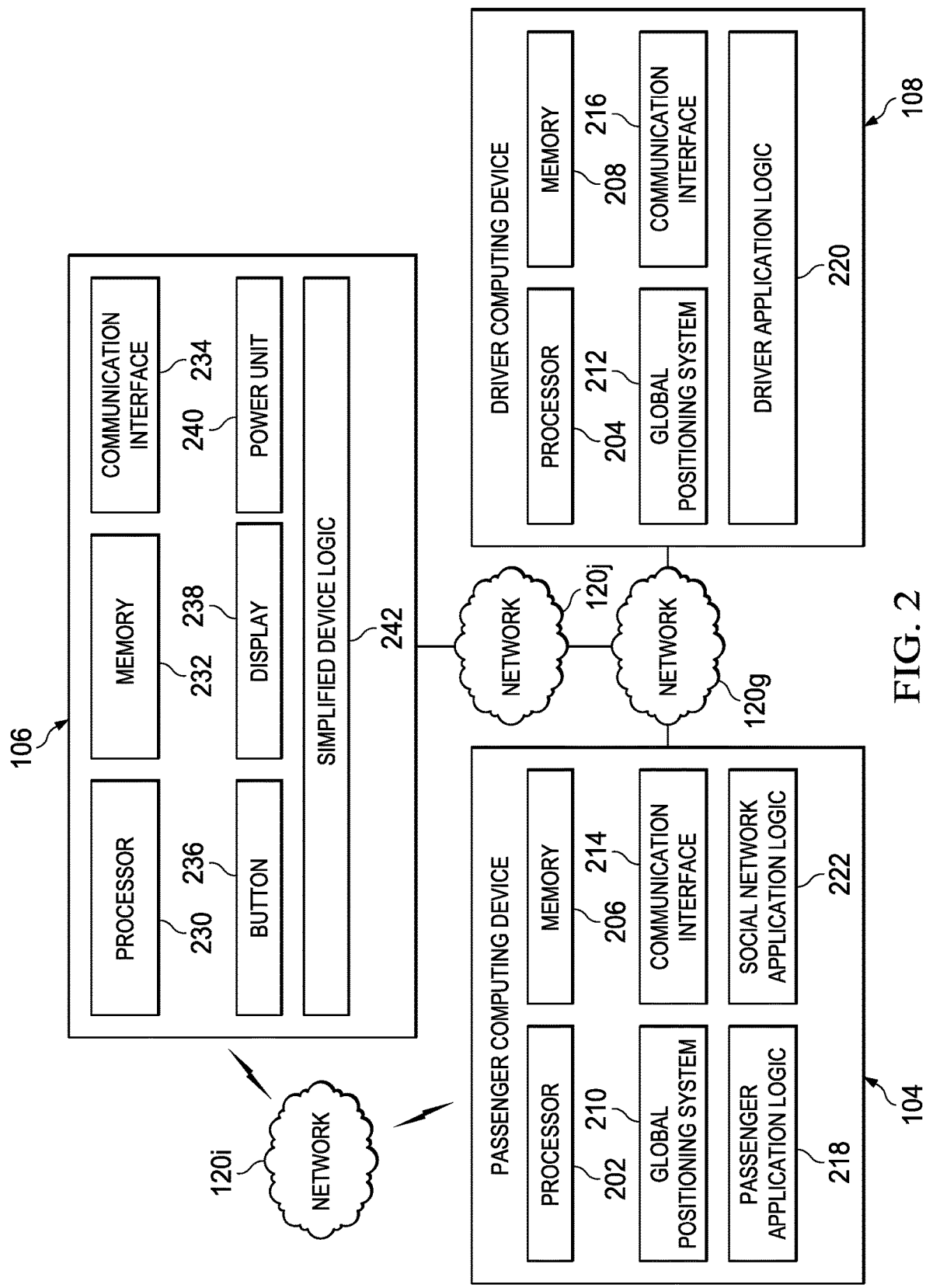
FIG. 2 illustrates a block diagram of a passenger computing device, a driver computing device, and a simplified transportation request device of the system of FIG. 1 in accordance with certain embodiments.

FIG. 2 illustrates a block diagram of a passenger computing device 104, a driver computing device 108, and a simplified device 106 of the system of FIG. 1 in accordance with certain embodiments. Herein, "passenger computing device" may be used to refer to a computing device used by a subscriber that has registered an account with the transportation service or other user who interacts with the transportation service (e.g., by communicating with the transportation service to request transportation) while "driver computing device" may be used to refer to a computing device used by a driver of the transportation service. A subscriber may refer to an individual or entity that has provided account data (e.g., user name, password, payment information, telephone number, home address, other account information, or any suitable combination thereof) to backend system 116 for storage by the backend system 116. In the embodiment shown, the devices may be communicatively coupled through network 120g which may include any suitable intermediary nodes, such as a backend system 116.

In the embodiment depicted, computing devices 104, 106, and 108 each include a computer system to facilitate performance of their respective operations. In particular embodiments, a computer system may include a processor, storage, and one or more communication interfaces, among other components. As an example, computing devices 104, 106, and 108 each include one or more processors 202, 204, and 230; memory elements 206, 208, and 232; and communication interfaces 214, 216, and 234 among other hardware and/or software. These components may work together in order to provide functionality described herein.

A processor 202, 204, or 230 may be a microprocessor, controller, or any other suitable computing device, resource, or combination of hardware, stored software and/or encoded logic operable to provide, either alone or in conjunction with other components of computing devices 104, 106, and 108, the functionality of these computing devices. In particular embodiments, computing devices 104, 106, and 108 may utilize multiple processors to perform the functions described herein.

A processor can execute any type of instructions to achieve the operations detailed in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array (FPGA), an erasable programmable read only memory (EPROM), an electrically erasable programmable ROM (EEPROM)) or an application specific integrated circuit (ASIC) that includes digital logic, software, code, electronic instructions, or any suitable combination thereof.

Memory 206, 208, and 232 may comprise any form of non-volatile or volatile memory including, without limitation, random access memory (RAM), read-only memory (ROM), magnetic media (e.g., one or more disk or tape drives), optical media, solid state memory (e.g., flash memory), removable media, or any other suitable local or remote memory component or components. Memory 206, 208, and 232 may store any suitable data or information utilized by computing devices 104 and 108, including software embedded in a computer readable medium, and/or encoded logic incorporated in hardware or otherwise stored (e.g., firmware). Memory 206, 208, and 232 may also store the results and/or intermediate results of the various calculations and determinations performed by processors 202, 204, and 230.

Communication interfaces 214, 216, and 234 may be used for the communication of signaling and/or data between computing devices 104, 106, and 108 and one or more networks (e.g., 120g, 120h, 120i) and/or network nodes (e.g., backend system 116 and application server 112) coupled to a network or other communication channel. For example, communication interfaces 214, 216, and 234 may be used to send and receive network traffic such as data packets. Each communication interface 214, 216, and 234 may send and receive data and/or signals according to a distinct standard such as an LTE, IEEE 802.11, IEEE 802.3, BLUETOOTH, or other suitable standard. In various embodiments, any of the data described herein as being communicated between elements of system 100 may be data generated using voice commands from a user or data generated independently of voice commands (e.g., data may be generated by a processor in response to the processor receiving data from another element or from an input device such as a touch screen). Communication interfaces 214, 216, and 234 may include antennae and other hardware for transmitting and receiving radio signals to and from other devices in connection with a wireless communication session over one or more networks 120.

GPS units 210 and 212 may include any suitable hardware and/or software for detecting a location of their respective computing devices 104 and 108. For example, a GPS unit may comprise a system that receives information from GPS satellites, wireless or cellular base stations, and/or other suitable source and calculates a location based on this information (or receives a calculated position from a remote source). In one embodiment, the GPS unit is embodied in a GPS chip.

Although various embodiments may include a simplified device 106 that includes a similar GPS unit, a particular embodiment includes a simplified device 106 that does not include a GPS unit. In such embodiments, the location of the simplified device 106 or other location preferred by the passenger may be determined in any suitable manner. For example, the simplified device may store one or more locations associated with the simplified device or one or more locations associated with the simplified device may be stored elsewhere (e.g., on the passenger device and/or backend system 116). In particular embodiments, the location of a device coupled to the simplified device 106 (e.g., a Wi-Fi access point, passenger computing device 104, or other computing device) may be obtained by the GPS unit and/or backend system 116 and used as a proxy for the location of the simplified device 106.

In the embodiment depicted, simplified device 106 also includes one or more physical buttons 236, display 238, and power unit 240. In a particular embodiment, physical button 236 is an electromechanical button that is physically displaced when pressed by a user. The pressing of the button may be detected in any suitable manner. For example, a conductive material on the button may function as a switch that can couple two segments of conductive material of the simplified device together when the button is pressed (but when the button is not pressed the two segments are not coupled together). When the button is pressed, current may flow across the segments and the presence of this current or a voltage generated by the current may be detected, indicating the pressing of the button.

In another embodiment, physical button 236 may be a capacitive or resistive touch sensitive button that is not physically displaced when touched by a user. In such embodiments, the pressing of the physical button 236 is detected based on a change in electrical characteristics resulting from contact between the button and an object such as a finger or stylus (or the close proximity of the object to the button).

Display 238 may comprise any suitable electronic display. In various embodiments, display 238 is a low power display, such as electronic paper, organic light-emitting display, liquid crystal display, electroluminescent display, light-emitting diode display or other suitable display.

Power unit 240 may comprise any suitable power source. In a particular embodiment, power unit 240 is operable to draw power from one or more batteries (e.g., one or more AA, AAA, CR2032, or other small batteries). In another embodiment, power unit 240 may alternatively or additionally be operable to couple to power supplied via an alternating current source (e.g., a power outlet). In a particular embodiment, power unit 240 does not include a connector for power supplied via an alternating current source, and is limited to being powered by one or more batteries or other power source (e.g., a solar cell).

Application logic 218 may include logic providing, at least in part, the functionality of the passenger application described herein. Similarly, application logic 220 may include logic providing, at least in part, the functionality of the driver application described herein. Similarly, simplified device logic 242 may include logic providing, at least in part, the functionality of the simplified device 106 described herein. In a particular embodiment, the logic of devices 104, 106, and 108 may include software that is executed by processor 202, 204, and 230. However, "logic" as used herein, may include but not be limited to hardware, firmware, software and/or combinations of each to perform a function(s) or an action(s), and/or to cause a function or action from another logic, method, and/or system. In various embodiments, logic may include a software controlled microprocessor, discrete logic (e.g., an application specific integrated circuit (ASIC)), a programmed logic device (e.g., a field programmable gate array (FPGA)), a memory device containing instructions, combinations of logic devices, or the like. Logic may include one or more gates, combinations of gates, or other circuit components. Logic may also be fully embodied as software.

In a particular embodiment, a user may supply login credentials for a social network system (e.g., FACEBOOK) or other social media system (e.g., TWITTER) to the transportation service through application logic 218. The transportation service (e.g., through backend system 116) may then access the user's account on the social network system or other social media system and access information associated with the user's account. As another example, passenger application logic 218 may access the user's social media account directly and integrate information from the account with other functionality of the passenger application logic.

Social network application logic 222 may provide a user interface to allow a passenger to interact with (e.g., enter and transmit information to and view information received from) a social network system. A social network system may store a record (i.e., a user profile) for each user of the system. The user profile may include any suitable information about the user, such as contact information, employment information, demographic information, personal interests, user-generated content, or other suitable information. The social network system may also store a record of the user's relationship with other users of the social network system. For example, such information may be stored as a social graph, wherein users (e.g., individuals, groups, business entities, organizations, etc.) may be represented as nodes in the graph and the nodes may be connected based on relationships between the users. A social network system may provide various services (e.g., photo sharing, wall posts, messaging, games, or advertisements) facilitating interaction between the users.

In various embodiments, the social network system may interact with passenger application logic 218 or backend system 116 to enhance the functionality of these components. As an example, background information associated with a passenger may be obtained by a backend system 116 and used to determine whether to route a request from the passenger to a particular driver.

In various embodiments, the social network system may provide any of the functionality described herein with respect to passenger application logic 218 in allowing a user to request a ride and may relay received requests for rides to backend system 116 along with any suitable identifying information about the user to facilitate pickup by a driver.

In various embodiments of the present disclosure, in addition to any combination of the features described above with respect to the passenger application, application logic 218 may provide additional features for the passenger application to enhance a passenger's experience. For example, application logic 218 may provide an interface allowing a passenger to communicate with backend system 116 and/or simplified device 106 (e.g., via simplified device logic 242) to configure various properties associated with a simplified device 106. For example, in various embodiments, a simplified device 106 has very limited user input means (e.g., one to four buttons), thus a device with additional functionality (e.g., a smartphone or other computing device) may be used to configure the functionality of the simplified device 106. Although the configuration functionality is described herein with respect to application logic 218 (i.e., the same application used to request rides directly from passenger computing device 104), in other embodiments, the same configuration functionality may be provided using other logic (e.g., a different application, such as a web browser or specialized configuration application).

In particular embodiments, application logic 218 may communicate configuration information with a simplified device 106 or multiple simplified devices 106 (e.g., if the user utilizes multiple simplified devices in various locations). In various embodiments, the configuration information may be explicitly specified by the user through an interface provided via application logic 218. In particular embodiments, any of the information described herein may be communicated in response to the user selecting an option provided via application logic 218 to configure the simplified device (e.g., the user may identify the device and select an option to configure the device without explicitly specifying at least a portion of the information that is sent to the simplified device).

Prior to communicating configuration information, a connection may be established between passenger computing device 104 and simplified device 106. Any suitable wired or wireless connection may be established. For example, device 104 and simplified device 106 may be coupled via a short range wireless network, such as a Bluetooth or WiFi network. As another example, device 104 and simplified device 106 may be coupled via cable, such as a Universal Serial Bus (USB) cable. Any other suitable connection may be used to couple the devices together. The application logic 218 of passenger computing device 104 and/or the simplified device logic 242 of simplified device 206 may communicate configuration information over the established connection.

In a particular embodiment, application logic 218 may send one or more network credentials (e.g., a network name and/or password) to simplified device logic 242. The credential may be access by application logic 218 in any suitable manner. For example, a user may input the credentials using an interface provided by the application logic 218 or the application logic 218 may retrieve one or more of the credentials from a memory of the passenger computing device 104. In various embodiments, the credentials may allow simplified device 106 to access a wireless access (e.g., at a home or business of the user) in order to communicate through one or more networks with backend server 302. Accordingly, after the connection between device 104 and simplified device 106 is torn down, simplified device 106 may initiate a connection with a wireless (e.g., WiFi) network via a wireless access point at any suitable time.

In a particular embodiment, application logic 218 may send information associated with the backend server 302 to simplified device logic 242. For example, one or more network addresses (e.g., IP or other addresses) of the backend server 302 may be provided by the application logic 218 to the simplified device 106 (in other embodiments the one or more network addresses may be pre-loaded into a memory of the simplified device 106 or otherwise included in logic of the simplified device 106). Any other suitable information facilitating communication between the simplified device 106 and the backend server 302 (e.g., encryption keys, certificates, or other information) may be provided by the application logic 218 to the simplified device 106. As another example, user account credentials (e.g., username and/or password) of the account that the simplified device 106 is to be associated with may be provided by the application logic 218 to the simplified device 106 so that the simplified device 106 can log into the account or otherwise identify the account to the backend server 302.

Application logic 218 may also send configuration information that specifies operations to be performed by the simplified device 106. In various embodiments, simplified device 106 includes one or more buttons. The simplified device 106 may be configured to perform various operations in response to actions performed by the user with respect to the one or more buttons ("button actions"). For example, the pressing of a button, the pressing of a button for an extended period of time, the pressing of a button for a short period of time, repeated pressings of a button (e.g., twice, three times, and/or more times), pressing two buttons together, or other button action may initiate one or more operations of the simplified device 106. In particular embodiments, the configuration information sent by application logic 218 may specify, for each button action that is distinguishable by the simplified device 106, the operation(s) that should be performed when that button action is detected. Thus, the operations performed by particular button actions may be reconfigurable. In various embodiments, the operation(s) performed in response to a particular button action may vary depending on a state of simplified device. For example, prior to requesting a ride, a particular operation may be performed in response to a button action (e.g., the button action may request a ride) while after a ride has been requested (but before the driver arrives), a different operation may be performed (e.g., the same button action may cancel a pending ride request).

Various operations that could be associated with button actions include the request of a ride, the request of a ride from a particular type or class of vehicle (e.g., multiple buttons could each be used to request a different type or class of vehicle or a single button could request different types or classes of vehicles based on the type of button action that is performed on that button), the request of a ride to be paid for from a particular payment source (e.g., multiple buttons could each be used to request a ride to be paid for from a distinct payment source or a single button could request payment from different payment sources based on the type of button action that is performed on that button), the request of information associated with a ride (e.g., expected time until pickup, surge pricing information), the cancellation of a requested ride, or other operation associated with a ride (such as any of the operations described herein as being able to be performed by application logic 218).

In various embodiments, the configuration information that is sent from the application logic 218 to the simplified device logic 242 may include information to be used in communication sequences to be sent from the simplified device 106 to the backend system 116 in response to one or more button actions. For example, the information may include a location where the pickup is to occur (e.g., the home address of the user if the simplified device 106 is placed in the user's home, the office address of the user if the simplified device 106 is placed in the user's office, or other suitable location). As other examples, the information may include any other information disclosed herein that may be included with a transportation request (such as parameters associated with the request). As yet another example, the information may include a unique identifier for the simplified device 242 (in other embodiments the unique identifier may be pre-loaded into a memory of the simplified device 106 or otherwise included in logic of the simplified device 106 and the simplified device 106 may instead communicate this identifier to the application logic 218 for transmission to the backend system 116 so that the backend system 116 may associate the simplified device with the user's account).

In various embodiments, the configuration information that is sent from the application logic 218 to the simplified device logic 242 may specify communication sequences associated with the operations to be performed in response to button actions. For example, a specific sequence of alphanumeric characters may correspond to one operation, a different sequence of alphanumeric characters may correspond to another operation, and so on. The simplified device may then send the proper communication sequence to the backend server 302 when the associated button action is performed. In various embodiments, the communication sequences used by the simplified device are more compact than communication sequences used by the application logic 218 when performing a similar operation. By reducing the amount of data that is transferred from the simplified device 106, the power usage of the device is reduced, thus resulting in longer battery life. As just one example, a single bit in the communication sequence sent from the simplified device 106 to the backend system 116 could be used to distinguish between a regular class of vehicle and a premium class of vehicle, between a ride request and a ride cancellation, etc. The application logic 218 could also send these communication sequences to the backend system 116 so that the backend system 116 can perform the proper operations in response to receiving the sequences from the simplified device (in other embodiments, the communication sequences may be defined by the backend system 116 and sent to the application logic 218, thus alleviating the need for receipt of the sequences at the backend system 116 from the application logic 218).

In various embodiments, a plurality of communication sequences associated with various available operations may be stored by the simplified device 106 (e.g., these sequences may be loaded onto or hardcoded into logic of the simplified device at the time of manufacture), and the configuration information received by simplified device 106 from application logic 218 may simply map the communication sequences to button actions.

In various embodiments, simplified device 106 may comprise one or more displays. In particular embodiments, the configuration information sent from the application logic 218 to the simplified device logic 242 may be associated with information to be displayed by simplified device 106.

For example, the configuration information may specify the information that is to be displayed by the simplified device 106. Any suitable information, such as the amount of time until passenger pickup, surge pricing information, the current time, battery life (of simplified device 106) remaining, or other information associated with a ride request (such as any of the information described herein as being provided to the application logic 218 in association with a ride request). As another example, the configuration information may specify where the particular information is to be displayed on the display.

In particular embodiments, the configuration information sent from the application logic 218 to the simplified device logic 242 may specify one or more update intervals associated with information presented. An update interval may specify how often the display of particular information is to be updated. In some embodiments, updating particular information may comprise requesting, by the simplified device, the information from the backend server 302. Thus, the update interval may specify how often a particular piece of information is requested. For example, an update interval may specify how often the simplified device should request the amount of time remaining until passenger pickup, surge pricing information, or other information associated with a ride request.

In particular embodiments, application logic 218 may communicate configuration information associated with one or more simplified devices with backend server 302. Although various embodiments describe the application logic 218 as providing this configuration information, in other embodiments any suitable logic of any suitable computing device may receive configuration information from the user and/or the simplified device and provide the configuration information to backend server 302.

In various embodiments, the configuration information may be explicitly specified by the user through an interface provided via application logic 218. In particular embodiments, any of the information described herein may be communicated in response to the user selecting an option provided via application logic 218 to configure the simplified device with the backend server (e.g., the user may identify the device and select an option to configure the device without explicitly specifying all or a portion of the information that is sent to the simplified device).

In a particular embodiment, application logic 218 may send information associated with the simplified device 106 to backend server 302. For example, a unique identifier of the simplified device 106, an encryption key or certificate to be used by the simplified device 106, or other suitable information associated with the simplified device 106 may be sent to backend server 302.

Application logic 218 may also send configuration information to the backend server 302 that specifies operations to be performed by the backend server 302. The backend server 302 may be configured to perform various operations in response to receiving indications that particular button actions have been performed on a simplified device 106. Thus, a backend server 302 may be able to receive messages from a simplified device that specify which operation(s) to perform and/or a backend server 302 may be able to receive an indication that a particular button action has been performed, look up the operation(s) that have been defined for that particular button action, and perform the operations. In some embodiments, the backend server 302 may store a mapping between available button actions and corresponding operations to be performed (similar to the mapping described above that may be stored by the simplified device 106). In various embodiments, application logic 218 may provide an interface for a user to specify operations to be performed in response to each available button action and to send this mapping to the backend server 302. The button actions may be any of the button actions described herein or other suitable button actions. The operations may include any operations associated with a ride request, such as fulfilling a ride request, fulfilling a ride request with a particular type or class of vehicle, fulfilling a ride request and charging the ride to a particular payment source, providing information associated with a ride (e.g., expected time until pickup, surge pricing information), cancelling a ride, or other suitable operations (such as any of the operations described herein as being able to be performed by backend server 302).

In particular embodiments, the configuration information sent from the application logic 218 to the backend server 302 may specify one or more update intervals that specify how often (or under what conditions) particular information is to be provided by the backend server 302 to the simplified device 106. For example, the configuration information may include how often the backend server is to send the amount of time remaining until passenger pickup, surge pricing information, or other information associated with a ride request to the simplified device 106. In various embodiments, such intervals may be provided to and/or stored by both the simplified device 106 and the backend server 302, enabling the simplified device 106 to enter a low power (e.g., sleep) state (e.g., in which a receiver of the simplified device 106 is turned off) during a time period in which no update is expected and then to power up to a higher power (e.g., wake) state in order to receive the update(s) (e.g., the receiver may be turned back on in the wake state), in order to conserve power. As another example, the configuration information may allow the specification of one or more conditions under which updated information is to be sent to the simplified device 106 by the backend server 302. For example, the configuration information may specify that an update on an estimated time until pickup should be sent if the estimated time until pickup calculated or accessed by the backend server 302 deviates from the estimated time until pickup that is displayed by the simplified device (e.g., the backend server 302 may track the time that is displayed by the simplified device 106 by counting a timer down from the last estimate provided to the simplified device).

Simplified device logic 242 may include any suitable logic for performing at least in part the functions of simplified device 106. In various embodiments, simplified device logic 242 may communicate configuration information with a passenger device and/or a backend server 302. In particular embodiments, simplified device logic 242 may detect button actions, formulate communication requests based on the detected button actions, and transmit the requests to backend server 302.

The requests may take any suitable form, including any of the communication sequences described above. In a particular embodiment, the request may simply be an identifier (e.g., the unique identifier) of the simplified device 106. In this embodiment, when backend server 302 receives the identifier of the device 106, the backend server may request a ride for the user based on parameters specified in configuration information previously received from and/or associated with the user. In an embodiment, if the backend server 302 receives the identifier of the device 106 again within a predetermined period of time or before the user is picked up, the backend server 302 may cancel the ride.

In some embodiments, the request may include an identifier of the simplified device and additional information. In some embodiments, such additional information may specify which button action was performed (in which case the backend server 302 may access memory of the backend server 302 to determine which operation are associated with the button action). In other embodiments, such additional information may specify which operation is to be performed by the backend server (the specifications of the operations may be encoded within the request in any suitable manner that is recognizable by the backend server). In some embodiments, the requests mirror the formats that are used for the same type of requests by passenger application logic 218 (e.g., the simplified device logic 242 and the passenger application logic 218 may utilize the same API of the backend server). In other embodiments, the requests are different from (e.g., more compact than) the same type of requests made by passenger application logic 218.

In a particular embodiment, a request sent from the simplified device 106 to the backend server 302 may include voice data provided by a user via, e.g., a microphone of simplified device 106 activated by the performance of a button action. In various embodiments, a voice recording of the user is sent in the request from the simplified device 106 to the backend server. In one embodiment, the voice data may comprise a destination location for the ride. The voice data may undergo a transcription process at the backend server. Once the destination location is determined by the backend server 302, it may be sent to the driver or used in the selection of the driver if a driver has not yet been selected. In particular embodiments, a ride may be requested by pushing or holding a button (or performing any other button action) on the simplified device and announcing the destination location. The simplified device may then send a ride request and a recording of the announced destination location to the backend server 302. In other embodiments, a voice recording received from the simplified device 106 at the backend server 302 may be sent to the driver (such that the user may communicate any suitable information to the driver).

In various embodiments, when the destination location is provided to the backend server by the simplified device 106 (e.g., via a voice input from the user), backend server 302 may calculate an estimated (or final) price for the ride request. Simplified device 106 may display this price to the user. The price may be displayed in response to the user requesting a ride or in response to a user requesting information associated with the ride. In various embodiments, the display shows the price without surge information that may or may not have been used to calculate the price (since the surge information is presumably factored into the price).

Simplified device logic 242 may also receive information from backend server and present the information to the user. The information may be presented in any suitable manner. For example, the information may be displayed by simplified device 106. In some embodiments, the display may be operable to display information in a textual or symbolic format. In various embodiments, the display may include one or more light emitting diodes (LEDs) that may convey particular information (which may be configurable via passenger application logic 218). As another example, the information may be played through a speaker of simplified device 106. In particular embodiments, information may be presented to the user in response to a button action. For example, after a ride has been ordered, an estimate of the amount of time remaining may be presented to the user (e.g., by a display or through a speaker). In some embodiments, the estimate may be continually or periodically presented automatically (i.e., without intervening user input). In other embodiments, the estimate may be presented for a limited time (e.g., announced once or displayed for a few seconds) when a button is pressed (or in response to any other suitable button action) in order to conserve battery life.

In various embodiments, simplified device logic 242 may include a timer in order to track an estimated amount of time remaining until pickup. Simplified device logic 242 may receive an estimate of an amount of time remaining until pickup from backend server 302, and may use the timer in conjunction with the received estimate in order to update the amount of time remaining for presentation to the user. The simplified device logic 242 may receive the estimate from the backend server 302 at any appropriate time. For example, the estimate may be sent by the backend server 302 to the simplified device 106 in response to an inquiry by the simplified device requesting an estimate of the remaining time, in response to a request by the simplified device for a ride, at periodic intervals from the backend server 302 in between the time a ride is requested and fulfilled, in response to a determination by the backend server 302 that an update of the estimated time remaining should be sent, or at any other suitable time.

In various embodiments of the present disclosure, in addition to any combination of the features described above with respect to the driver application, driver application logic 220 may provide additional features for the driver application to enhance the functionality of the transportation service.

In various embodiments, driver application logic 220 may allow the driver to enter an availability status, such as available, not available, or inactive, as described above. In various embodiments, driver application logic 220 may also allow the driver to enter information associated with an inactive status, such as a duration of the status, a start time of the status, or exception criteria and may transmit the status indication and any associated information to the backend system 116. The duration of the status may be indicated in any suitable manner. For example, the driver may specify a time (e.g., a finite time duration or an end time) indicating when the inactive status should end and the driver's status should return to available. Driver application logic 220 may also provide an interface for allowing the driver to specify exception criteria associated with his inactive status. When a driver enters an inactive status, the backend system 116 will withhold sending transportation requests to the driver unless the specified exception criteria is met. The driver may enter any suitable criteria and may specify which conditions and how many conditions must be met before a transportation request is sent to the driver in any suitable manner. Any suitable criteria may be specified by the driver. In one example, a criterion may be that a minimum cost (e.g., actual or expected cost) for the transportation request (or the portion of the transportation request that the driver will be servicing) must be met or exceeded. In another example, a criterion may be that a minimum average cost (e.g., actual or expected cost per unit of time) for the transportation request must be met or exceeded. In some embodiments this cost may be averaged over the time duration of the transportation request itself (or the portion of the transportation request that the driver will be servicing) or may also be averaged over additional travel time to and/or from the ride for the driver. In another example, a criterion may include a time length to be compared against an expected duration of the ride (which again may or may not also include travel to and/or from the pickup or destination location of the ride). For example, the driver may only want rides shorter than the specified time length or longer than the specified time length.

Driver application logic 220 may also present received navigational data to the driver to facilitate the fulfillment of transportation requests. For example, driver application logic 220 may receive navigational data from backend system 116 and navigate the driver to a pickup location, to a handoff location, to a destination location specified by the passenger, or other suitable locations (any of which may correspond to a sightseeing attraction).

Figure 3:
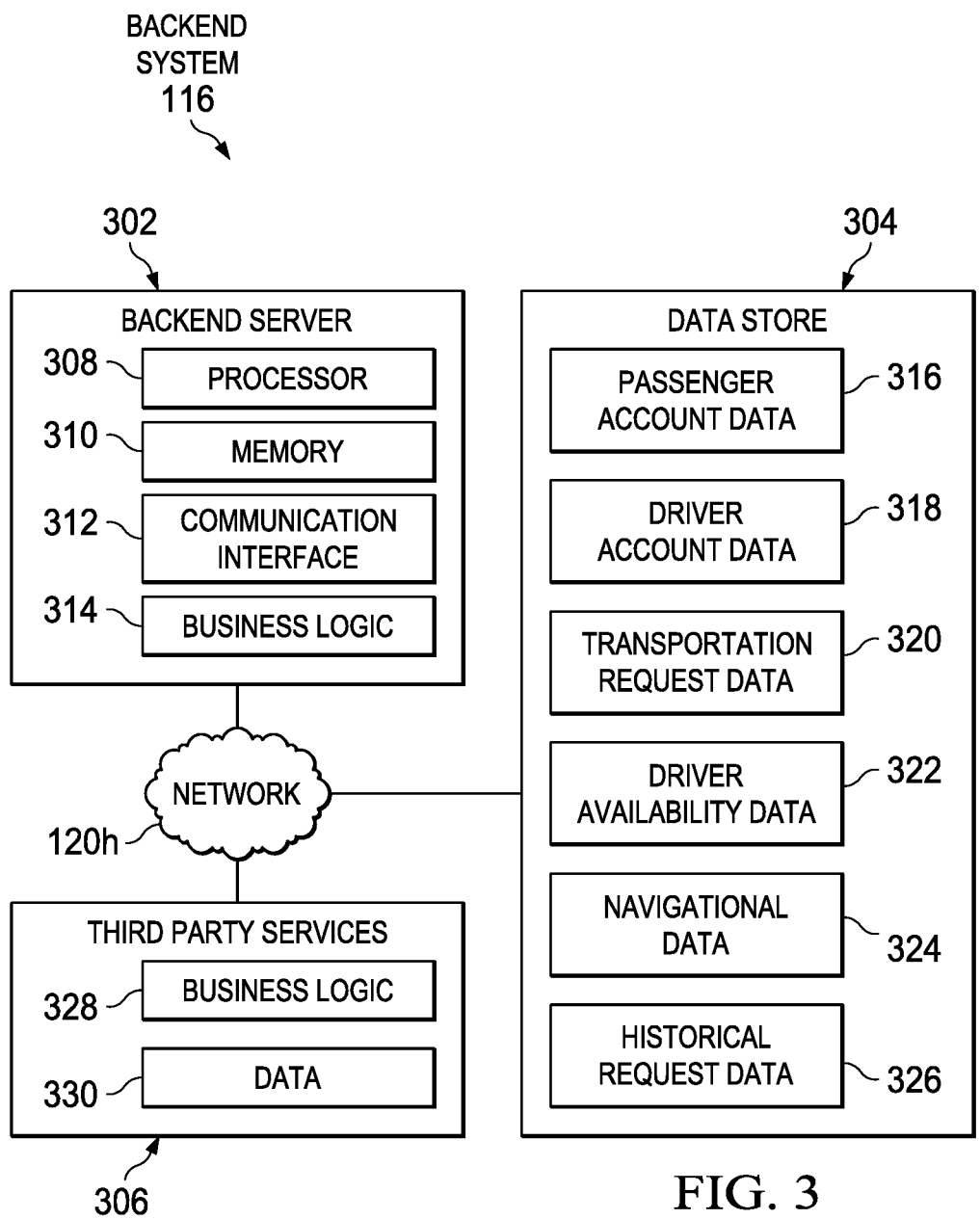
FIG. 3 illustrates a block diagram of a backend system of the system of FIG. 1 in accordance with certain embodiments.

FIG. 3 illustrates a block diagram of a backend system 116 of the system of FIG. 1 in accordance with certain embodiments. Although FIG. 3 depicts a particular implementation of the backend system 116, the backend system may include any suitable devices to facilitate the operation of the transportation service described herein. In the embodiment depicted, backend system includes backend server 302, data store 304, and third party services 306 coupled together by network 120h. In various embodiments, backend server 302, data store 304, and/or third party services 306 may each comprise one or more physical devices (e.g., servers or other computing devices) providing the functionality described herein. In some embodiments, one or more of backend server 302, data store 304, and third party services 306 (or portions thereof) are deployed using a cloud service and may comprise one or more virtual machines or containers. In various embodiments, backend server 302 may be capable of performing any suitable operations herein described as being performed by backend system 116.

In the embodiment depicted, backend server 302 includes a computer system to facilitate performance of its operations. As an example, backend server 302 includes one or more processors 308, memory elements 310, and communication interfaces 312, among other hardware and software. These components may work together in order to provide backend server functionality described herein. Processor 308 may have any suitable characteristics of the processors 202 and 204 described above. In particular embodiments, backend server 302 may utilize multiple processors to perform the functions described herein. In various embodiments, reference to a processor may refer to multiple discrete processors communicatively coupled together.

Similarly, memory 310 may have any suitable characteristics of memories 206 and 208 described above. Memory 310 may store any suitable data or information utilized by backend server 302, including software embedded in a computer readable medium, and/or encoded logic incorporated in hardware or otherwise stored (e.g., firmware). Memory 310 may also store the results and/or intermediate results of the various calculations and determinations performed by processor 308.

Communication interface 312 may also have any suitable characteristics of communication interfaces 214 and 216 described above. Communication interfaces 312 may be used for the communication of signaling and/or data between backend server 302 and one or more networks (e.g., networks 120) and/or network nodes (e.g., computing devices 104 and 108, data store 304, third party services 306, and application server 112) coupled to a network or other communication channel.

Business logic 314 may have any suitable characteristics of application logic 218 and 220 described above. Business logic 314 may include logic providing, at least in part, the functionality of the backend server described herein. In a particular embodiment, business logic 314 may include software that is executed by processor 308. However, in other embodiments, business logic 314 may take other forms such as those described above with respect to application logic 218 and 220.

Backend server 302 may communicate with data store 304 to initiate storage and retrieval of data related to the transportation service. Data store 304, may store any suitable data associated with the transportation service in any suitable format(s). For example, data store 304 may include one or more database management systems (DBMS), such as SQL Server, Oracle, Sybase, IBM DB2, or NoSQL data bases (e.g., Redis and MongoDB).

In the embodiment depicted, data store 304 includes passenger account data 316, driver account data 318, transportation request data 320, driver availability data 322, navigational data 324, and historical request data 326. The various data may be updated at any suitable intervals.

Passenger account data 316 may include any suitable information associated with passenger accounts, such as contact information (e.g., real names and addresses), user names and passwords (or other authentication information), payment information (e.g., credit card or bank account numbers and associated information), passenger preferences (e.g., preferred type or color of car), ratings the passenger has given drivers, ratings the passenger has received from drivers, or other information associated with passenger profiles.

Passenger account data 316 may also include configuration data associated with one or more simplified devices 106 that are linked to a passenger account. Any suitable combination of configuration data (e.g., such as any of the configuration data described herein or other suitable configuration data) may be stored in passenger account data 316. For example, passenger account data 316 may include an identifier of a simplified device 106, one or more button actions of a simplified device and associated operations, communication sequences associated with operations to be performed by the backend server 302 in response to receiving the communication sequences from the simplified device, a pickup address associated with the simplified device and/or a button action of the device, a destination address associated with the simplified device, and/or a button action of the device, a type or class of vehicle associated with the simplified device and/or a button action of the device, or other suitable configuration information. In various embodiments, passenger account data 316 may be accessed in response to a ride request sent by simplified device 106 when a button action is performed in order to determine parameters (e.g., pickup location, destination location, class or type of vehicle) associated with the request.

Driver account data 318 may include any suitable information associated with driver accounts, such as contact information (e.g., real names and addresses), user names and passwords (or other authentication information), payment collection information (e.g., bank account information), vehicle information (e.g., models and colors of cars the drivers utilize, maximum capacity of the cars of the drivers), merchandise offered by the drivers, whether the drivers are available to transport passengers, whether the drivers have opted for automatic acceptance of transportation requests (whereby the backend server 302 may assign a transportation request to the driver without waiting for the driver to indicate acceptance of a request), or other suitable information.

Transportation request data 320 may comprise pending requests (i.e., requests that have not yet been fulfilled) received from passengers. Each request may include any suitable information, such as any combination of one or more of an identification of the passenger making the request, the time the request was made, the current location of the passenger, the desired pick-up location, the desired pick-up time, one or more sightseeing attractions, one or more viewing times, the estimated time remaining until a driver can pick up the passenger, the actual pick-up time, the desired destination location of the passenger (which the passenger may or may not provide at the time the request is made), the expected arrival time at the destination location, the type of vehicle requested, estimated fare for the trip, current accumulated fare for the trip, estimated time and mileage remaining in the trip, other information specified by the user (e.g., requested merchandise, requested minimum rating of driver), whether a driver has been assigned to a request, which driver (or drivers) has been assigned to a request, any other suitable information associated with a transportation request, or any suitable combination of the preceding.

Driver availability data 322 may comprise information associated with drivers that are available to transport passengers. In some embodiments, driver availability data 322 may also comprise information associated with drivers that are not available to transport passengers (e.g., because they are off-duty or currently transporting a passenger). An entry in the driver availability data 322 may include an identification of a driver and any suitable associated information, such as one or more of a current location of the driver, whether the driver is available to transport passengers, whether the driver is currently transporting a passenger, a destination location of a current trip of the driver, an estimate of how long it will be before the driver finishes his current trip, whether the driver has opted for automatic acceptance of transportation requests, or other suitable information. Driver availability data 322 may also include any of the information described above that might be used by the backend system 116 in determining which driver(s) to assign to a transportation request such as a status of a driver, a preferred work location of a driver, appointments of a driver, shift start and end times, or other suitable information. In various embodiments, driver availability data 322 may store the fuel or electric power level of the vehicle of the driver based on information received from the driver. In a particular embodiment, the fuel or electric power level is sent by driver computing device 108 to backend server 302. For example, driver computing device 108 may be integrated with the vehicle and may periodically sense the fuel or electric power level of the vehicle and transmit this information to backend server 302. As another example, the driver may enter such information into driver computing device 108 which may then transmit it to backend server 302.

Navigational data 324 may comprise information supporting navigation functions provided by the passenger applications and driver passenger applications. For example, navigational data 324 may comprise a start location, a destination location, and/or map data that may be sent to passenger computing devices 104 and/or driver computing devices 108 to allow the devices to display maps and associated indicators (e.g., location of passenger(s), location of driver(s), desired routes, etc.). In some embodiments, the navigational data may also comprise information indicative of the amount of time required to travel between various locations. In some embodiments, navigational data 324 may comprise historic and/or real time data about the flow of traffic in particular areas enabling backend server 302 to calculate an estimated time required to travel from one location to another.

Historical request data 326 may comprise information about completed requests. In some embodiments, historical request data 326 may also include information about canceled requests. The information for each request may include any combination of the information listed above with respect to requests stored in the transportation request data 320 as well as any combination of additional data such as the time at which the destination location was reached, the total time of the trip, the total fare, a rating given by the passenger to the driver or by the driver to the passenger for the trip (or portions thereof), or other suitable information associated with the trip.

In various embodiments, backend server 302 may access third party services 306 through business logic 328 to access data 330. Third party services 306 may represent any suitable number of devices operated by any suitable number of third parties that are distinct from an entity that operates the backend system 116 and/or data store 304. For example, in some embodiments the navigational data may be obtained from a third party service 306 rather than data store 304, or additional third party navigational data such as map data or historical and/or current traffic flow information may be used to supplement navigational data 324. As another example, third party services 306 may authenticate users on behalf of the backend server 302 (e.g., through an account of the user with the third party). Business logic 328 may comprise any suitable logic operable to receive requests for data from backend system 116 and/or computing devices 104 and 108 and provide responses to the requests.

Backend server 302 may be in communication with each passenger computing device 104 and each driver computing device 108 that is utilizing the transportation service at a particular time. Backend server may store information received from the computing devices 104 and 108 in data store 304. Backend server 302 may also receive and respond to requests made by computing devices 104 and 108 by processing information retrieved from data store 304.

When a passenger opens the passenger application, the backend server 302 may log the passenger in based on a comparison of authentication information provided by the passenger computing device 104 with authentication information stored in passenger account data 316. The passenger may then request a ride. Alternatively, the passenger may request a ride via simplified device 106. The request is received by the backend server 302 and stored in transportation request data 320. Backend server 302 may access driver availability data 322 to determine one or more drivers that would be suitable to fulfill the request from the passenger. In one embodiment, backend server 302 selects a particular driver (e.g., based on the driver's locality with respect to the passenger's pick-up location) and sends information associated with the request to the driver. The driver indicates whether he accepts or rejects the request via his computing device 108. If the driver rejects the request, backend server 302 selects a different driver and the process is repeated until the backend server 302 receives an accepted request from a driver. In another embodiment, backend server 302 may select a plurality of drivers that may fulfill a transportation request and allow the passenger to select one of the drivers. The backend server 302 may proceed to notify the driver of the request in a similar manner to that described above. In yet another embodiment, backend server 302 may select a plurality of drivers that may fulfill a transportation request and notify each driver of the transportation request. The backend server 302 may then allocate the request to one of the drivers based on any suitable criteria. For example, the driver who is the first to accept the request may be assigned to the request. As another example, if multiple drivers accept the request within a given timeframe, the request may be assigned to the most suitable driver (e.g., the driver that is closest to the pick-up location or a driver that has a car that meets preferred characteristics of the transportation request).

Once the request has been accepted by a driver (or at another suitable time), the backend server 302 notifies the passenger that a driver has accepted his request and provides any suitable information associated with the driver (e.g., driver's current location, driver's contact information, model and color of vehicle, estimated time of arrival, etc.) to the passenger (e.g. via simplified device 106 if the request was sent through simplified device 106 or via passenger computing device 104 if the request was sent through the passenger computing device 104).

The backend server 302 may provide navigation data (e.g., the passenger's current location or other pickup location and/or directions to the current location or other pickup location, or a destination location and/or directions to the destination location, etc.) to the driver computing device 108 to direct the driver to the passenger's pickup location and subsequently to direct the driver to the passenger's destination location. The backend server 302 may also provide real-time updates associated with the trip to both the passenger and the driver.

Once the passenger's destination location has been reached, the backend server 302 may facilitate payment of the fare for the trip using payment information stored in passenger account data 316 and/or driver account data 318 (or information supplied by the passenger at the time of the transaction). In particular embodiments, once a particular driver's portion of a transportation request is fulfilled, the backend server 302 may facilitate payment of the fare for the portion of the trip serviced by that driver. The backend server 302 may also receive ratings associated with the trip (or portion thereof) for the passenger and driver and store these ratings in data store 304.

The backend server 302 may direct the operations of the backend system 116 in providing various backend system 116 functionality described herein. For example, the backend server 302 may receive configuration information associated with a simplified device 106 and store the configuration information in order to service ride requests (and associated requests) received from the simplified device.

Backend server 302 may communicate any suitable information with simplified device 106. For example, in response to a communication from simplified device 106 requesting an estimated time until pickup and/or surge pricing information, backend server may respond with the requested estimate or surge pricing information (e.g., a surge multiplier comprising a multiplier to be applied to the normal charge for a ride, a surge surcharge that is to be added to the normal charge for a ride, an indication of when surge pricing will end, or other suitable surge information) that may be in effect when driver supply is relatively low, passenger requests are relatively high, traffic is relatively slow, and/or during other conditions warranting higher than normal prices for rides. In various embodiments, such information may be provided to the simplified device 106 in response to a request that does not request a ride (e.g., the user may desire such information before requesting a ride). In various embodiments, such information may be sent by backend server 302 to simplified device 106 in response to a determination that the information has changed. For example, if the estimated time until pickup has deviated (with respect to the estimated time that was last communicated minus the amount of time that has expired since the estimated time was communicated to the simplified device 106) beyond an expected threshold amount, the updated estimated time until pickup may be sent to the simplified device 106. Similarly, if surge information previously sent has changed, updated surge information may be sent to the simplified device 106. In various embodiments, the estimated time until pickup or the surge information may be sent at periodic intervals. In some embodiments, the periodic intervals are configured by a user and/or stored at the simplified device 106 and backend server 302 so that the simplified device 106 can activate receiver logic to receive the information at the appropriate time and then deactivate the receiver logic to save battery power.

As another example, backend server 302 may send one or more communications to simplified device 106 in response to receiving a ride request. For example, backend server 302 may send a communication confirming that a driver has accepted the ride request and is en route to the pickup location associated with the simplified device 106 (or button action if the simplified device 106 is associated with multiple pickup locations each associated with a different button or button action). In some embodiments, the backend server 302 may also send a communication to simplified device 106 confirming that the ride request was received before a driver is arranged for the ride (to inform the user that a driver is being located).

As another example, backend server 302 may send a communication confirming that a cancellation request received from the simplified device 106 has resulted in cancellation of a requested ride.

As another example, backend server 302 may send a communication indicating that the driver has arrived at the pickup location. In various embodiments, backend server 302 may send a communication indicating that the driver is a predetermined amount of time away from the pickup location (e.g., 5 minutes).

In various embodiments, backend server 302 may identify passengers that would be likely to use one or more simplified devices. For example, backend server 302 may analyze historical request data to determine whether a passenger has frequently requested rides from a common pickup location (e.g., the backend server 302 may use one or more thresholds in making such a determination). Once a passenger has been identified as a likely user, the backend server 302 may send an advertisement for a simplified device or an offer for a free simplified device to the passenger (e.g., via application logic 218 or other means). In other embodiments, the transportation service may communicate the advertisement or offer to the passenger in any other suitable manner. In various embodiments, if the user purchases or accepts the simplified device, the transportation service may preconfigure the device and/or backend server 302 with the pickup location (which may be the same as the common location used to identify the user as a prospective user of the simplified device) and/or other suitable information, such that the device is ready for use without further configuration information passing between the simplified device 106 and backend server 302 (the device may of course be configured by the user in order to connect to one or more wireless access points or other devices in order to initiate a connection with the backend server 302 when requesting rides).

FIG. 4 illustrates a simplified transportation request device 106D in accordance with certain embodiments. In the embodiment depicted, simplified device 106D includes a button 402 and a display light 404. One or more button actions may be performed on button 402 to initiate operations of simplified device 106D. In one embodiment, a button action (e.g., pressing the button for a predetermined period of time) may be performed to pair the simplified device with a passenger computing device 104. Various configuration information may then be transferred between the simplified device and the passenger computing device in order to configure the simplified device 106D with a backend server 302. Once the simplified device 106D has been configured, one or more other button actions may be performed with respect to the button to initiate operations associated with a transportation service (e.g., requesting a ride, requesting information associated with a ride, cancelling a ride, etc.).

Display light 404 may be used to present any suitable information to the user. For example, display light 404 may be used to indicate that the simplified device has been paired to another device (e.g., a passenger computing device or other computing device used to configure the simplified device with a backend server 302) or has failed to pair, that the simplified device has successfully connected to a wireless access point or has failed to connect, that a ride request has been sent to the backend server 302, that a ride request has been accepted by the backend server (and thus a driver is on the way), that a ride request has not been accepted, that a driver has arrived at the pickup location, that the battery life of the simplified device is low, or other suitable indication. In various embodiments, display light 404 may utilize multiple light colors and/or multiple patterns (e.g., solid light, slowly blinking light, rapidly blinking light, etc.) to differentiate between the indications provided by the display light.

FIG. 5 illustrates a simplified transportation request device 106E in accordance with certain embodiments. Simplified device 106E includes a button 502 and a display 504. Button 502 may have any suitable characteristics of button 402 or other button described herein. Display 504 may display any suitable information described herein with respect to a transportation request or the operation of simplified device 106E. In the embodiment depicted, display 504 displays an estimated time 506 remaining until a driver is to arrive at a pickup location, an indication 508 of the strength of a Wi-Fi, cellular, BLUETOOTH signal, or other wireless signal (which could alternatively be a binary indication of whether the simplified device is connected to a wireless access point), and an indication 510 of the remaining battery life of simplified device 106E (which alternatively could be an indication that appears when low battery life is detected). Simplified device 106E may comprise a countdown timer that is used in conjunction with one or more estimated times received from backend server 302 in order to provide a relatively accurate amount of time for display by indication 506. Both of the devices depicted in FIGS. 4 and 5 have one button as the exclusive means of direct user input (i.e., all direct user input to the simplified device 106 involves use of the button). For example, in some embodiments, button actions with respect to the button are the exclusive means of direct user input. As another example, in addition to providing direct input, a button action may additionally or alternatively initiate another form of direct user input, such as a voice input via a microphone. In various embodiments, a simplified device 106 may also receive indirect user input via various means (such as from a passenger computing device or other computing device coupled wirelessly to the simplified device 106).

FIG. 6 illustrates a simplified transportation request device 106F in accordance with certain embodiments. Simplified device 106F includes a plurality of buttons 602 and a display 504. Buttons 602 may have any suitable characteristics of button 402, button 502, or other button described herein. In the embodiment depicted, each button may initiate one or more distinct operations. For example, button 602A may initiate a ride request and button 602B may cancel a ride request. As another example, button 602A may initiate a ride request having a first pickup location (e.g., a home of the user) and button 602B may initiate a ride request having a second pickup location (e.g., an office of the user). As another example, button 602A may initiate a ride request to be paid for from a first payment source (e.g., a user's personal credit card) and button 602B may initiate a ride request to be paid for from a second payment source (e.g., a user's business credit card). In various embodiments, simplified device 106 may include one or more additional buttons. For example, simplified device 106 may include a button to initiate the request of various information (e.g., time until pickup or surge information) so that the user can view such information before requesting a ride. In various embodiments, simplified device may have one, two, three, four, or more buttons that collectively are the exclusive means of direct user input to the simplified device 106.

In various embodiments, the operation(s) associated with each button is configurable by a user (e.g., via a device coupled to the simplified device 106 and/or coupled to backend server 302). Display 604 may have any suitable characteristics of display 504 (similarly display 504 may have any suitable characteristics of display 604). In the embodiment depicted, display 604 includes indications 608 and 610, which are similar to indications 508 and 510 depicted in display 504. Indication 606 displays the current time. In various embodiments, indication 606 may additionally or alternatively display an estimated time until pickup in response to receiving an estimate from backend server 302. In alternative embodiments, the estimated time until pickup may be displayed concurrently with the current time in a different part of display 604. Display 604 also includes indications 612 which display surge information. In the embodiment depicted, the surge information includes a surge multiplier and an amount of time until surge pricing, although any suitable surge information may be displayed. In various embodiments, the particular indicators displayed by display 604 is configurable by a user (e.g., via a device coupled to the simplified device 106 and/or coupled to backend server 302).

Figure 7:
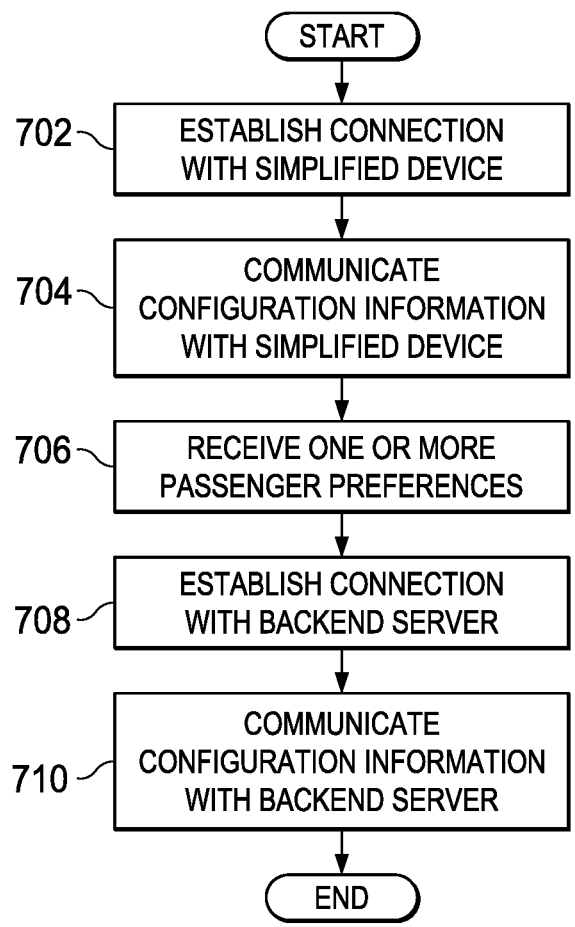
FIG. 7 illustrates a flow for configuring a backend server to service transportation requests from a simplified transportation request device in accordance with certain embodiments.

FIG. 7 illustrates a flow for configuring a backend system 302 to service transportation requests from a simplified transportation request device 106 in accordance with certain embodiments. Various operations of flow 700 may be performed, for example, by passenger computing device 104 and/or other suitable computing device.

At 702, a connection is established with a simplified device. The connection may be any suitable wired connection (e.g., a USB connection) or wireless connection (e.g., BLUETOOTH or Wi-Fi connection). At 704, configuration information is communicated with simplified device 106. This may involve sending configuration information to the simplified device 106 and/or receiving configuration information from the simplified device.

At 706, one or more passenger preferences are received. For example, a passenger may enter in such preferences using an interface provided by a passenger computing device or other computing device. Passenger preferences may include, for example, one or more pickup locations to be associated with the simplified device, a type or class of vehicle to be associated with the simplified device, or other preferences describing conditions associated with a ride request (such as those described herein).

At 708, a connection is established with backend server 302. At 710, configuration information including, for example, the passenger preferences, is communicated to the backend server. The backend server 302 may store such information in order to properly service transportation requests received from simplified device 106.

Some of the operations illustrated in FIG. 7 may be repeated, combined, modified or deleted where appropriate, and additional steps may also be included. Additionally, operations may be performed in any suitable order or concurrently without departing from the scope of particular embodiments.

Figure 8:
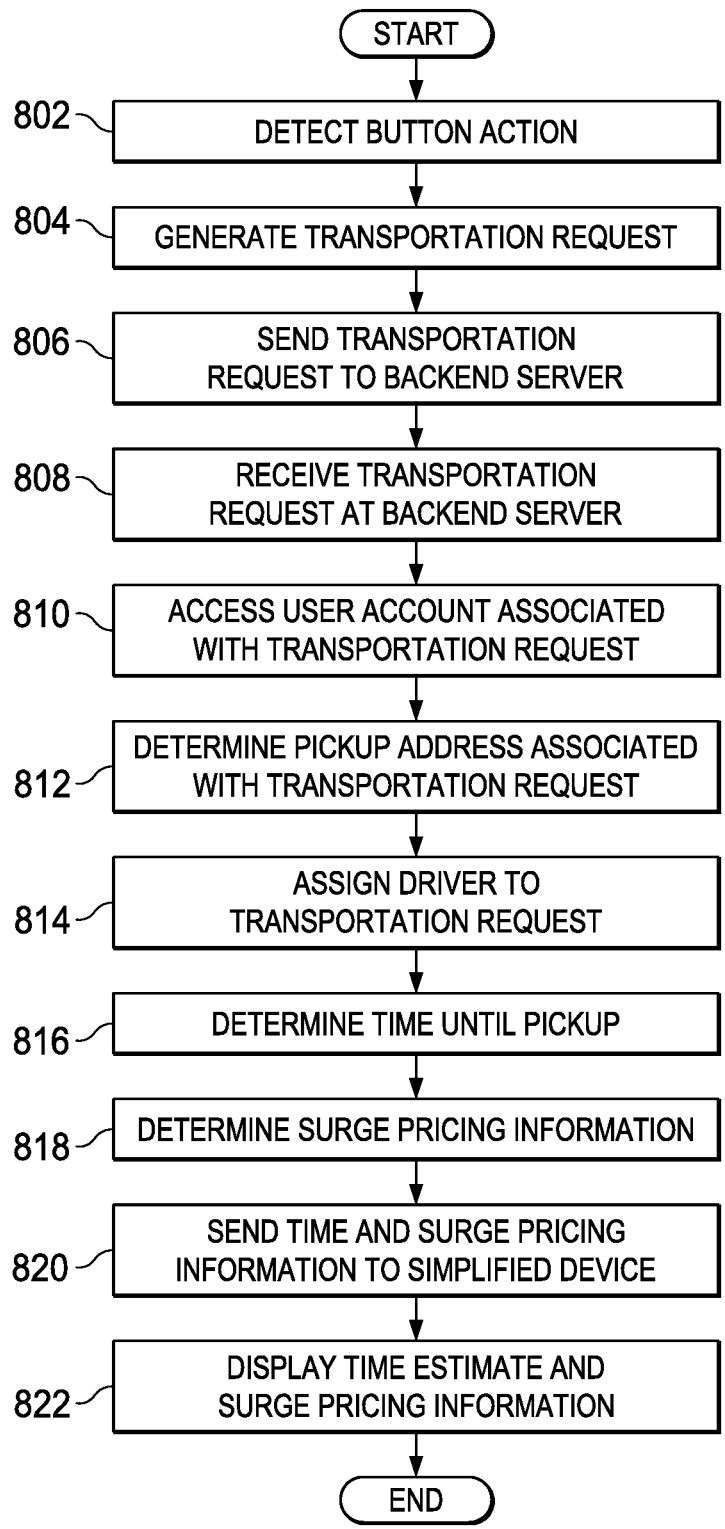
FIG. 8 illustrates a flow for servicing a transportation request from a simplified transportation request device in accordance with certain embodiments.

FIG. 8 illustrates a flow for servicing a transportation request from a simplified transportation request device 160 in accordance with certain embodiments. Various operations of flow 800 may be performed, for example, by simplified device 106 and/or backend server 302.

At 802, a button action is detected. At 804, a transportation request is generated in response to the button action. At 806, the transportation request is sent to a backend server 302. At 808, the transportation request is received at the backend server. At 810, a user account associated with the transportation request is accessed. The user account may be identified based on information included in the transportation request. For example, the transportation request may include an identifier unique to the simplified device (e.g., a MAC address, serial number, or other identifier) or an identifier of the user account (e.g., a username) that may be used to identify the user account. In particular embodiments, an identifier unique to the simplified device may have been associated with the user account during configuration of the simplified device.

At 812, a pickup address associated with the transportation request is determined. For example, the user account may be accessed and the pickup address may be identified within the user account. As another example, the transportation request may explicitly include the pickup address (e.g., the simplified device may have been configured with the pickup address at the time of configuration of the simplified device such that it may include the pickup address when it generates a transportation request).

At 814, a driver is assigned to the transportation request. At 816, an estimate of the amount of time until a driver can pick up the passenger is determined. The estimate may be based on any suitable information, such as the distance of the driver from the pick-up location, current traffic conditions, or other suitable information. At 818, surge pricing information is determined. For example, a surge multiplier and/or a time at which surge pricing will end may be determined. At 820, the estimated time of pick-up and the surge pricing information is sent to the simplified device 106. At 822, an estimated time of pickup or estimated time remaining until pickup and the surge pricing information is displayed by the simplified device 106.

Some of the operations illustrated in FIG. 8 may be repeated, combined, modified or deleted where appropriate, and additional steps may also be included. Additionally, operations may be performed in any suitable order or concurrently without departing from the scope of particular embodiments.

It is also important to note that the flows in FIGS. 7-8 illustrate only some of the possible scenarios that may be executed by, or within, the various components of the system described herein. Some of these operations may be deleted or removed where appropriate, or these operations may be modified or changed considerably without departing from the scope of the present disclosure. In addition, a number of these operations may have been described as being executed concurrently with, or in parallel to, one or more additional operations. However, the timing of these operations may be altered considerably. The preceding operational flows have been offered for purposes of example and discussion.

The functionality described herein may also be performed by any suitable component of the system. For example, certain functionality described herein as being performed by backend server 302, may, in various embodiments, be performed by any combination of one or more passenger computing devices 104 or driver computing devices 108 where appropriate. Similarly, certain functionality described herein as being performed by a passenger computing device 104 or a driver computing device 108 may, in various embodiments, be performed by backend server 302 where appropriate.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
receiving, at one or more servers via a passenger computing device paired to a transportation request device, configuration information for the transportation request device, the configuration information comprising one or more passenger preferences associated with transportation requests transmitted from the transportation request device to the one or more servers;
receiving, from the one or more servers, a transportation request from the transportation request device;
in response to receiving the transportation request, accessing, by the one or more servers, an account of a user corresponding to the transportation request device and the passenger computing device to identify the one or more passenger preferences comprising a geographic location stored as a preset pickup location associated with the transportation request device; and
transmitting, from the one or more servers to a driver computing device, navigation data comprising the preset pickup location to fulfill the transportation request submitted by the transportation request device.

2. The method of claim 1, wherein the one or more servers receive the transportation request from the transportation request device in response to detecting activation of a first input element of the transportation request device configured to submit transportation requests associated with the preset pickup location.

3. The method of claim 1, further comprising:
receiving, from the one or more servers, an additional transportation request from the transportation request device; and detecting, by the one or more servers, activation of a second input element of the transportation request device configured to submit transportation requests associated with a second preset pickup location.

4. The method of claim 3, further comprising:
in response to receiving the additional transportation request, accessing, by the one or more servers, the account of the user corresponding to the transportation request device and the passenger computing device to identify the one or more passenger preferences comprising a second geographic location stored as the second preset pickup location associated with activation of the second input element of the transportation request device; and
transmitting, from the one or more servers to an additional driver computing device, navigation data comprising the second preset pickup location to fulfill the transportation request submitted by the transportation request device.

5. The method of claim 1, wherein the transportation request comprises an identifier unique to the transportation request device.

6. The method of claim 1, further comprising:
calculating an estimate of an amount of time for the driver computing device to arrive at the preset u location; and
communicating the estimate to the transportation request device for presentation to the user.

7. The method of claim 6, further comprising:
receiving, from the transportation request device, a request for an update of the estimate; and
sending the update of the estimate to the transportation request device.

8. The method of claim 6, further comprising:
starting a timer based on the estimate;
calculating a second estimate of the amount of time for the driver computing device to arrive at the preset pickup location; and
sending, to the transportation request device, the second estimate in response to a determination that a deviation between the timer and the second estimate exceeds a predetermined threshold.

9. The method of claim 1, wherein receiving the transportation request from the transportation request device comprises detecting a first activation of an input element of the transportation request device, and the method further comprises:
detecting, by the one or more servers after detection of the first activation and prior to arrival of the driver computing device at the preset pickup location, a second activation of the input element of the transportation request device; and
in response to detecting the second activation of the input element of the transportation request device, cancelling the transportation request.

10. The method of claim 1, further comprising communicating an indication associated with surge pricing to the transportation request device in response to receiving the transportation request.

11. The method of claim 1, wherein receiving the transportation request from the transportation request device comprises detecting one of a first type of activation or a second type of activation at an input element of the transportation request device, the first type of activation configured in association with the preset pickup location and the second type of activation configured in association with a second preset pickup location.

12. The method of claim 11, wherein the first type of activation comprises a first button action and the second type of activation comprises a second button action that differs from the first button action.

13. A system comprising:
at least one processor; and
at least one non-transitory computer-readable storage medium storing instructions that, when executed by the at least one processor, cause the system to:
receive, via a passenger computing device paired to a transportation request device, configuration information for the transportation request device, the configuration information comprising one or more passenger preferences associated with transportation requests transmitted from the transportation request device to the system;
receive a transportation request from the transportation request device;
in response to receiving the transportation request, access an account of a user corresponding to the transportation request device and the passenger computing device to identify the one or more passenger preferences comprising a geographic location stored as a preset pickup location associated with the transportation request device; and
transmit, to a driver computing device, navigation data comprising the preset pickup location to fulfill the transportation request submitted by the transportation request device.

14. The system of claim 13, further comprising instructions that, when executed by the at least one processor, cause the system to receive the transportation request from the transportation request device in response to detecting activation of a first input element of the transportation request device configured to submit transportation requests associated with the preset pickup location.

15. The system of claim 13, further comprising instructions that, when executed by the at least one processor, cause the system to:
receive an additional transportation request from the transportation request device; and
detect activation of a second input element of the transportation request device configured to submit transportation requests associated with a second preset pickup location.

16. The system of claim 15, further comprising instructions that, when executed by the at least one processor, cause the system to:
in response to receiving the additional transportation request, access the account of the user corresponding to the transportation request device and the passenger computing device to identify the one or more passenger preferences comprising a second geographic location stored as the second preset pickup location associated with activation of the second input element of the transportation request device; and
transmit, to an additional driver computing device, navigation data comprising the second preset pickup location to fulfill the additional transportation request submitted by the transportation request device.

17. A non-transitory machine-readable storage medium storing instructions that, when executed by at least one processor, cause a computing device to:
receive, via a passenger computing device paired to a transportation request device, configuration information for the transportation request device, the configuration information comprising one or more passenger preferences associated with transportation requests transmitted from the transportation request device to the computing device;

receive a transportation request from the transportation request device;

in response to receiving the transportation request, access an account of a user corresponding to the transportation request device and the passenger computing device to identify the one or more passenger preferences comprising a geographic location stored as a preset pickup location associated with the transportation request device; and transmit, to a driver computing device, navigation data comprising the preset pickup location to fulfill the transportation request submitted by the transportation request device.

18. The non-transitory machine-readable storage medium of claim 17, further comprising instructions that, when executed by the at least one processor, cause the computing device to:

receive an additional transportation request from the transportation request device;

detect activation of a second input element of the transportation request device configured to submit transportation requests associated with a second preset pickup location;

in response to receiving the additional transportation request, access the account of the user corresponding to the transportation request device and the passenger computing device to identify the one or more passenger preferences comprising a second geographic location stored as the second preset pickup location associated with activation of the second input element of the transportation request device; and transmit, to an additional driver computing device, navigation data comprising the second preset pickup location to fulfill the additional transportation request submitted by the transportation request device.

19. The non-transitory machine-readable storage medium of claim 18, wherein the transportation request comprises an identifier unique to the transportation request device.

20. The non-transitory machine-readable storage medium of claim 17, further comprising instructions that, when executed by the at least one processor, cause the computing device to:

receive the transportation request from the transportation request device by detecting a first activation of an input element of the transportation request device;

detect, after detection of the first activation and prior to arrival of the driver computing device at the preset pickup location, a second activation of the input element of the transportation request device; and in response to detecting the second activation of the input element of the transportation request device, cancel the transportation request.

* * * * *